(12) United States Patent
Gogo (10) Patent No.: US 6,595,310 B2
(45) Date of Patent: Jul. 22, 2003

(54) SWING ARM TYPE SUSPENSION FOR VEHICLES

(75) Inventor: Kazuhiko Gogo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/927,357

(22) Filed: Aug. 13, 2001

(65) Prior Publication Data

US 2002/0027035 A1 Mar. 7, 2002

(30) Foreign Application Priority Data

Sep. 5, 2000 (JP) ........................................ 2000-268514

(51) Int. Cl.[7] ............................................... B62K 25/10
(52) U.S. Cl. ....................................... 180/219; 280/285
(58) Field of Search .................................. 280/285, 284, 280/286, 288, 275; 180/219, 227, 285

(56) References Cited

U.S. PATENT DOCUMENTS

| | | | | |
|---|---|---|---|---|
| 4,556,119 A | * | 12/1985 | Shiratsuchi | ................. 180/219 |
| 4,706,774 A | * | 11/1987 | Tsuboi | ......................... 180/227 |
| 4,712,638 A | * | 12/1987 | Kawaguchi et al. | ........ 180/219 |
| 5,062,495 A | * | 11/1991 | Padgett | ....................... 180/227 |
| 5,240,269 A | * | 8/1993 | Kerr | ........................... 280/285 |
| 5,908,078 A | * | 6/1999 | Belil Creixell | ............. 180/219 |
| 6,076,845 A | * | 6/2000 | Lawwill et al. | .............. 280/284 |

* cited by examiner

Primary Examiner—Lesley D. Morris
Assistant Examiner—Tony Winner
(74) Attorney, Agent, or Firm—Birch, Stewart, Kolasch & Birch, LLP (57) ABSTRACT

One end of a swing arm is mounted to a pivot shaft provided on a power unit so as to be capable of a swinging motion. A rear wheel is rotatably mounted to the other end of the swing arm, an upper end of a cushion unit is mounted to the swing arm, and the lower end of the cushion unit is operatively linked via a linking mechanism to the power unit by a power unit swing shaft located at a position below the pivot shaft. Therefore, it is not necessary to mount the upper end of the cushion unit directly to the vehicle body frame. Fixtures such as electrical components can be concentrated in the vehicle body frame, whereby the physical capability of the vehicle can be enhanced and productivity of vehicle production processes can be improved.

17 Claims, 10 Drawing Sheets

SWING ARM TYPE SUSPENSION FOR VEHICLES

BACKGROUND OF THE INVENTION

The present invention claims the benefit of Japanese Patent Application No. 2000-268514, filed Sep. 5, 2000, the entirety of which is hereby incorporated by reference.

1. Field of the Invention

The present invention relates to a swing arm type suspension, and more particularly to a swing arm type suspension for vehicles suitable for enhancing the physical capability of the vehicle, increasing productivity, decreasing vehicle size, and expanding design options of a vehicle body frame.

2. Description of the Background Art

Figure 9:
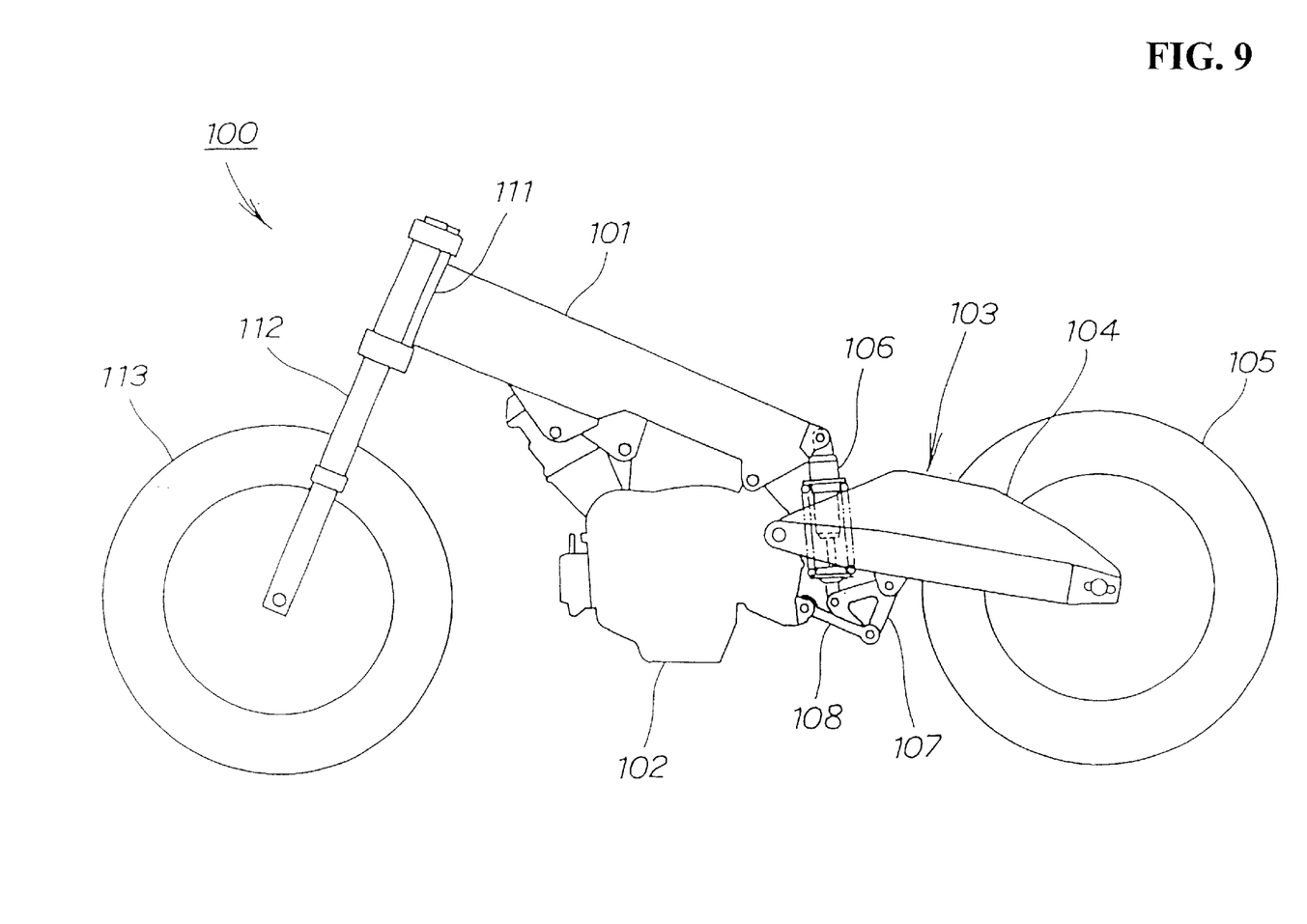
FIG. 9 is a side view of a vehicle provided with a swing arm type suspension of the background art.

FIG. 9 is a side view of a vehicle 100 provided with a swing arm type suspension 103 of the background art. A power unit 102 including an engine and a change gear is mounted at a lower portion of a vehicle body frame 101 of the vehicle 100. The swing arm type suspension 103 is disposed at the rear of the vehicle body frame 101 and the power unit 102.

The swing arm type suspension 103 is constructed in such a manner that a swing arm 104 is mounted at the rear of the power unit 102 so as to be capable of a swinging motion. This vehicle 100 also includes a rear wheel 105 mounted at a rear end of the swing arm 104, one end of a cushion unit 106 mounted at the rear portion of the vehicle body frame 101, and a first linking member 107 mounted to the swing arm 104 is linked to the other end of the cushion unit 106. A second linking member 108 is mounted to the power unit 102 and is linked to the first linking member 107.

A head pipe 111 is fixed at the front end of the vehicle body frame 101. A front fork 112 is rotatably mounted to the head pipe 111 and is operatively connected with a front wheel 113.

Figure 10:
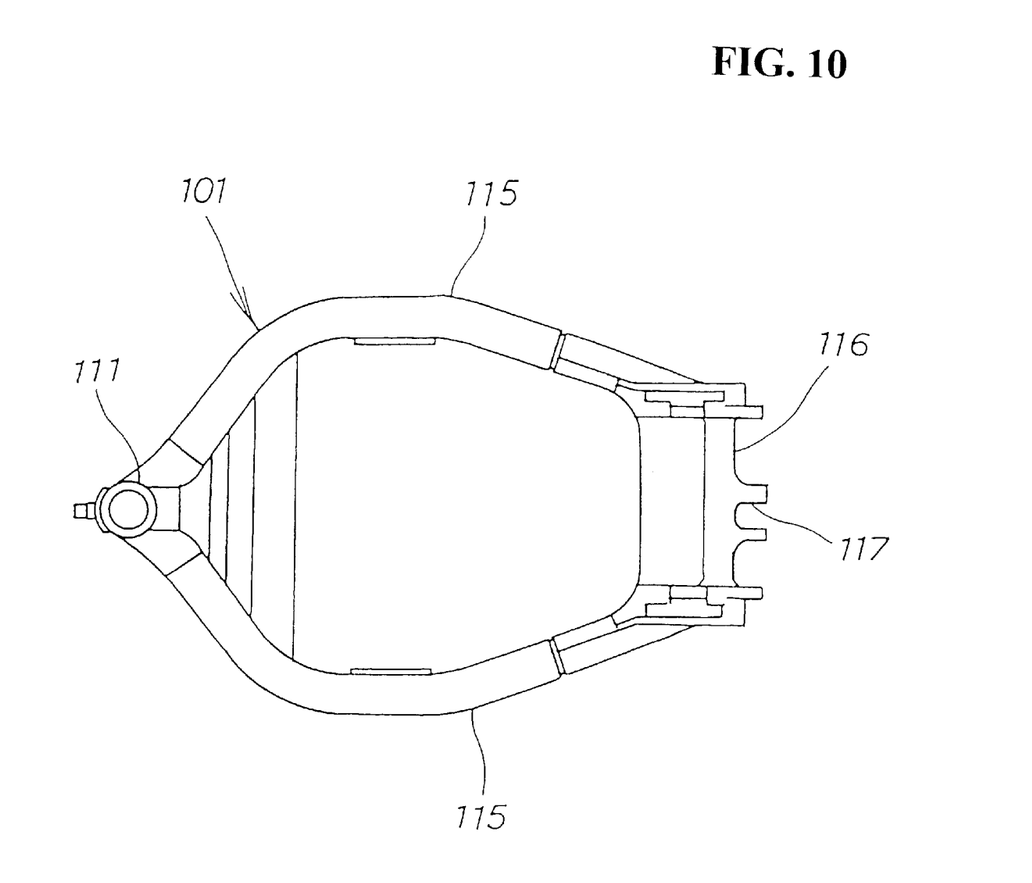
FIG. 10 is a plan view of a vehicle body frame of the background art.

FIG. 10 is a plan view of a vehicle body frame of the background art. A vehicle body frame 101 includes a pair of left and right main frames 115, 115 extending backward from the head pipe 111. A cross beam 116 lying between the respective rear ends of the main frames 115, 115 is provided for lateral support. A mounting portion 117 is provided on the cross beam 116 for mounting the upper end of the cushion unit 106.

In the related art described above, the cross beam 116 is located in a space near the center of the vehicle body. Unfortunately, this region of the vehicle body frame 101 is very suitable for positioning fixtures such as a battery and various electrical components within the vehicle body frame 101. Therefore, by mounting the cross beam 116 in this region, the fixtures described above are required to be relocated to other parts of the vehicle body frame 101.

Accordingly, the weight of these components is moved from the center of the vehicle 100. When these fixtures are relocated, the assembler has to move as he/she assembles those fixtures to the vehicle 100. This results in lowering of productivity and manufacturing efficiency. In addition, it may result in upsizing of the vehicle 100 or it may simply limit the available configurations of the vehicle body frame 101.

When the above-described vehicle 100 of the background art is assembled in the production line, a subassembly that is assembled in advance is often used to attempt to speed the manufacturing process. In the subassembly, the cushion unit 106, the first and the second linking members 107, 108, and the rear wheel 105 mounted to the swing arm 104 are all mounted to the vehicle body, e.g. to a part of the vehicle body frame 101 and the power unit 102.

In this case, the respective ends of the swing arm 104, cushion unit 106, and the second linking member 108 of the subassembly are mounted to the vehicle body frame 101 and the power unit 102. However, since the ends of the cushion unit 106 and the second linking member 108 do not maintain their positioning with respect to the swing arm 104, the subassembly cannot be easily transported. In addition, assemblers cannot easily handle the subassembly when it is assembled to the power unit 102. Therefore, additional time is required in assembling the same.

SUMMARY OF THE INVENTION

The present invention overcomes the shortcomings associated with the background art and achieves other advantages not realized by the background art.

It is an object of the present invention to provide a swing arm type suspension for vehicles in which the fixtures and components are concentrated in a central portion of the vehicle body frame in order to enhance the physical capability of the vehicle, increase assembler productivity, reduce vehicle size, and expand available design configurations of a vehicle body frame.

It is an object of the present invention to permit subassemblies to be utilized in the production process, in which the subassembly assembled in the production line can easily be transported and the subassembly can easily be mounted to the side of the vehicle body.

These and other objects of the present invention are accomplished by a swing arm type suspension for vehicles comprising a swing arm having a first end and a second end, the first end pivotably mounted to a pivot shaft provided on a side of a vehicle body so as to be capable of achieving a swinging motion, and the second end includes a portion for rotatably mounting a wheel thereon; and a cushion unit including an upper end and a lower end, the upper end of the cushion unit is mounted to the swing arm, and the lower end of the cushion unit is connected to the side of the vehicle body at a position below the pivot shaft.

In the background art, the upper end of a cushion unit is mounted to the vehicle body frame such as a seat frame or the like. In contrast, the upper end of the cushion unit is mounted to the swing arm in an embodiment of the present invention. Accordingly, it is not necessary to provide a cross pipe or a mounting member for mounting the upper end of the cushion unit within the vehicle body frame. Therefore, fixtures such as electrical components can be concentrated in the center of the vehicle body frame so that the physical capability of the vehicles specifically designed for offroad driving or for racing can be enhanced, and productivity of the vehicle can be increased.

These and other objects of the present invention are further accomplished by a swing arm type suspension for vehicles comprising a swing arm having a first end and a second end, the first end pivotably mounted to a pivot shaft provided on a side of a vehicle body so as to be capable of achieving a swinging motion, and the second end includes a portion for rotatably mounting a wheel thereon; and a cushion unit including an first end and a second end, the first end of the cushion unit is mounted to the swing arm, and the second end of the cushion unit is connected to a linking mechanism at a position below the pivot shaft, wherein the second end of the cushion unit is mounted to a first linking member linked to the swing arm.

When assembling a vehicle in the production line, by assembling the cushion unit, the first and the second linking member, and the rear wheel to the swing arm as a subassembly in the sub-line, both ends of the cushion unit can be positioned with respect to the swing arm. Therefore, only the ends of the swing arm and the second linking member must be mounted to the vehicle body side for assembly of the subassembly to the vehicle body side in the main production line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
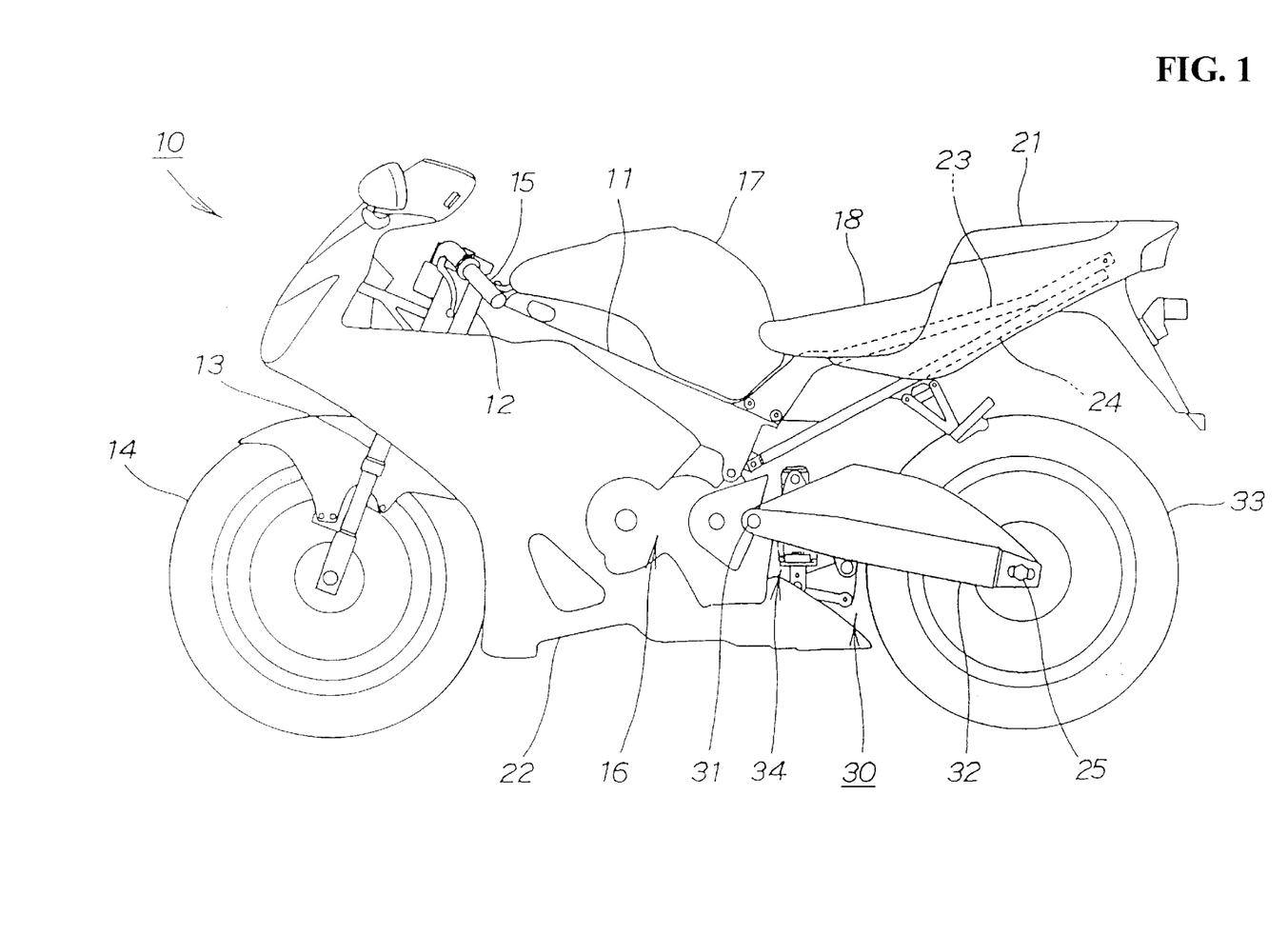
FIG. 1 is a side view of a vehicle provided with a swing arm type suspension according to a first embodiment of the present invention.
Figure 2:
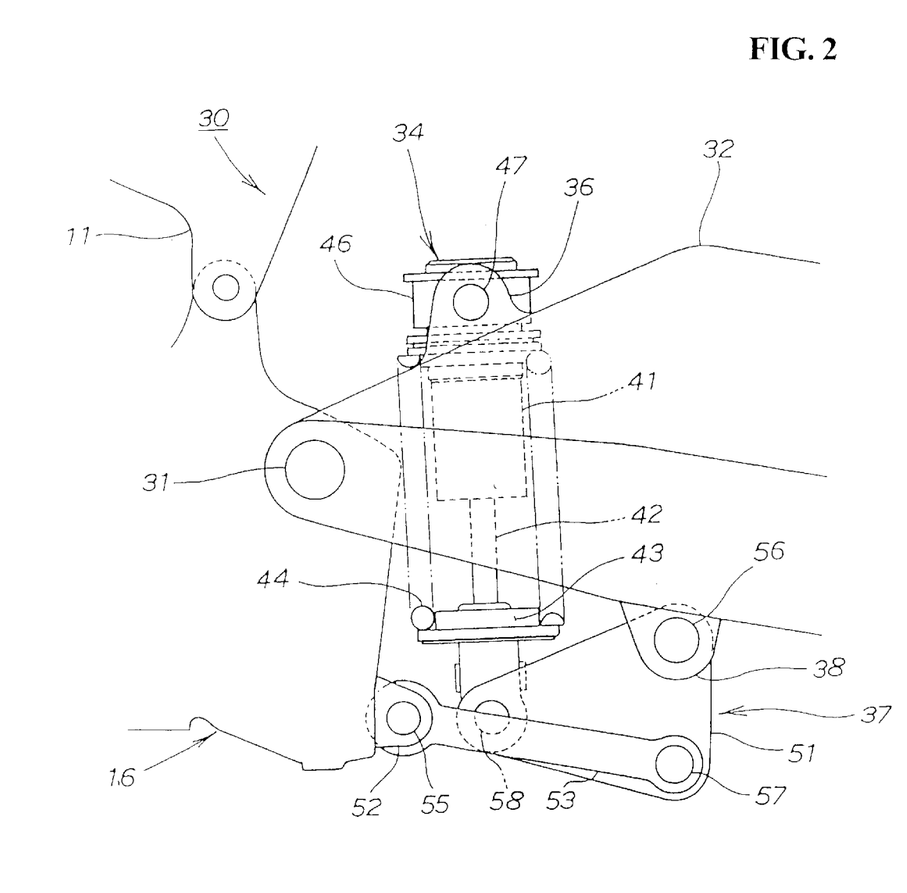
FIG. 2 is a side view of the swing arm type suspension according to the first embodiment of the present invention.
Figure 3:
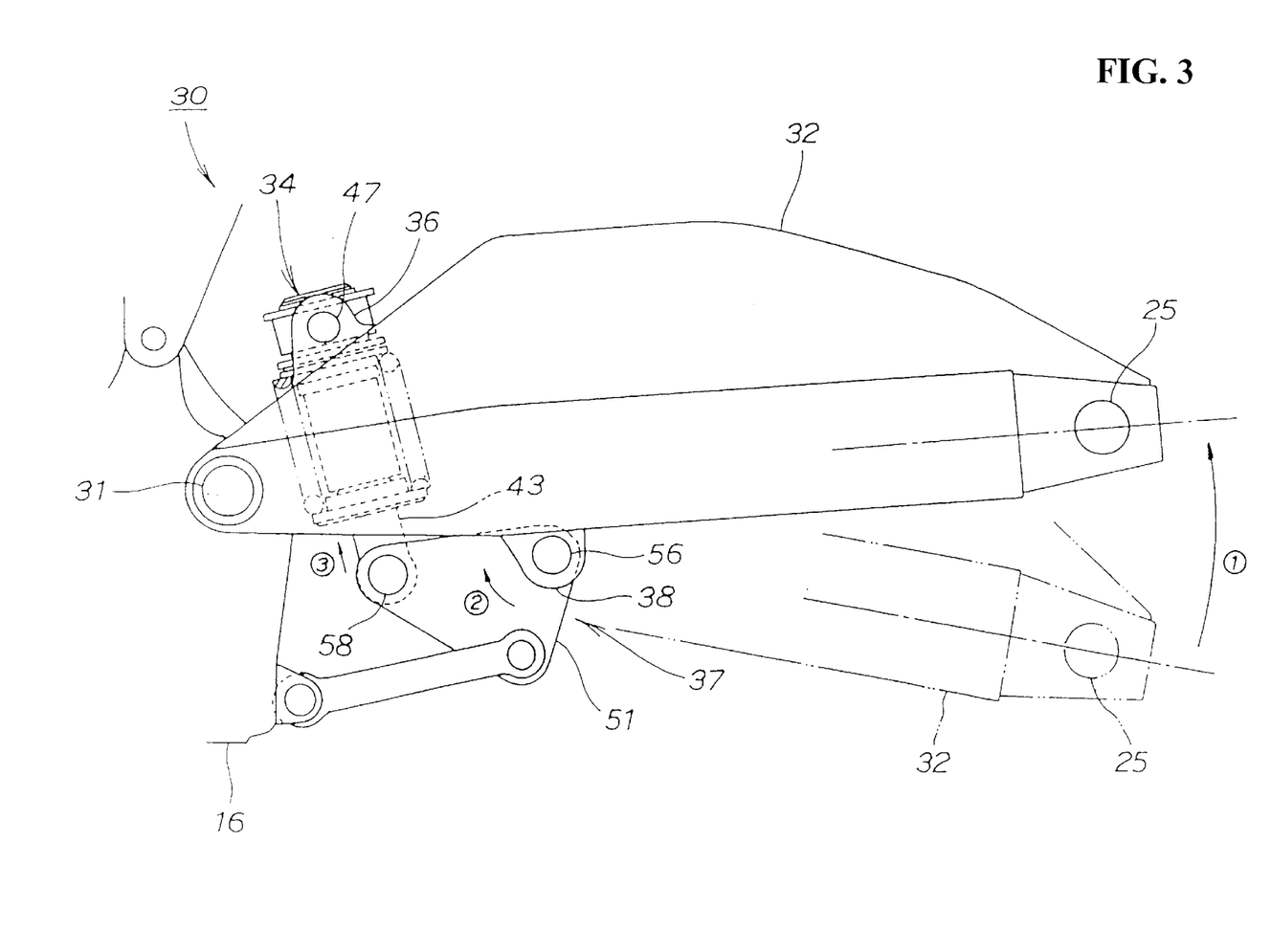
FIG. 3 is a side view of the swing arm type suspension according to the first embodiment of the present invention.
Figure 4:
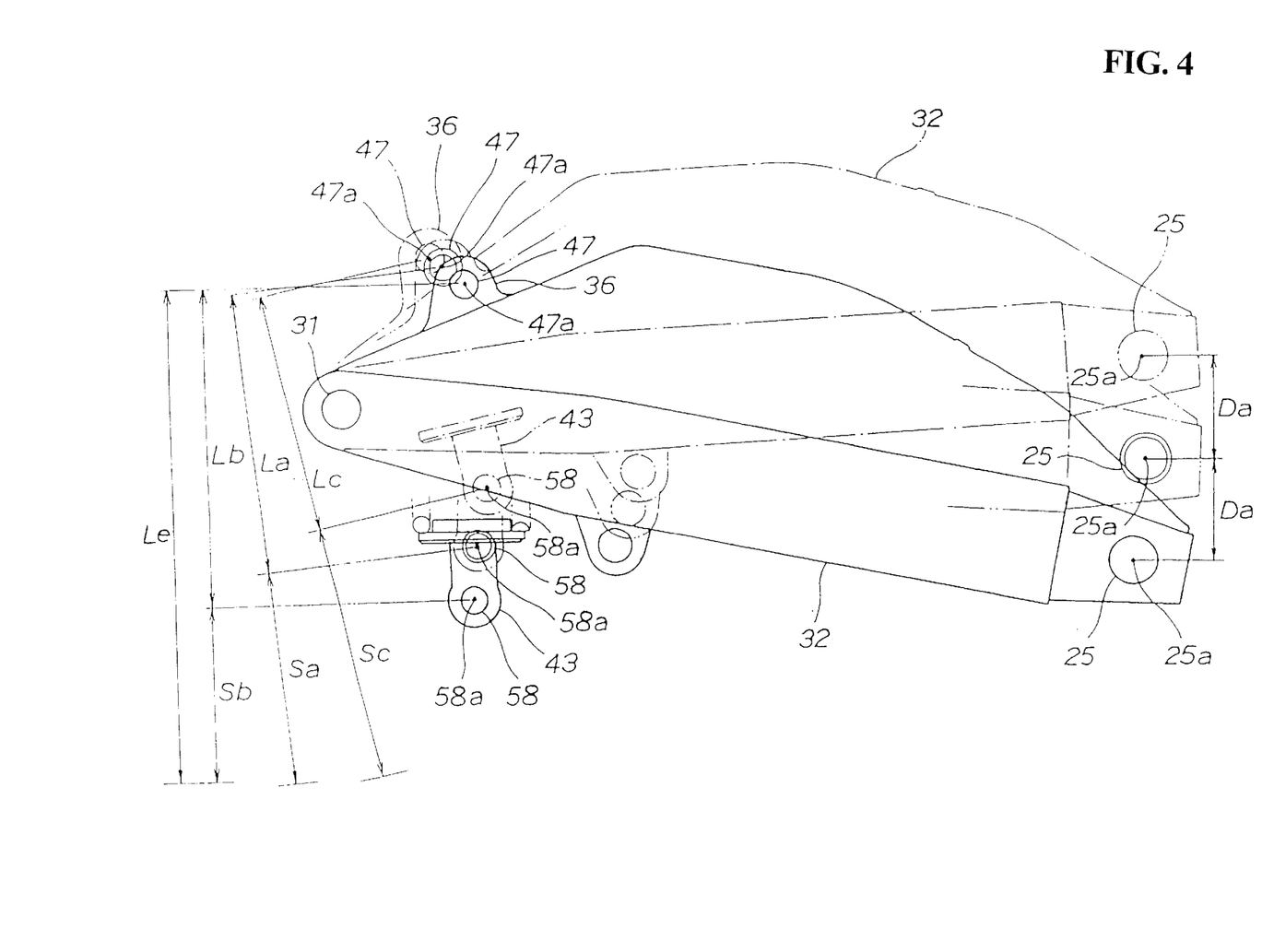
FIG. 4 is a side view of the swing arm type suspension according to the first embodiment of the present invention.
Figure 5:
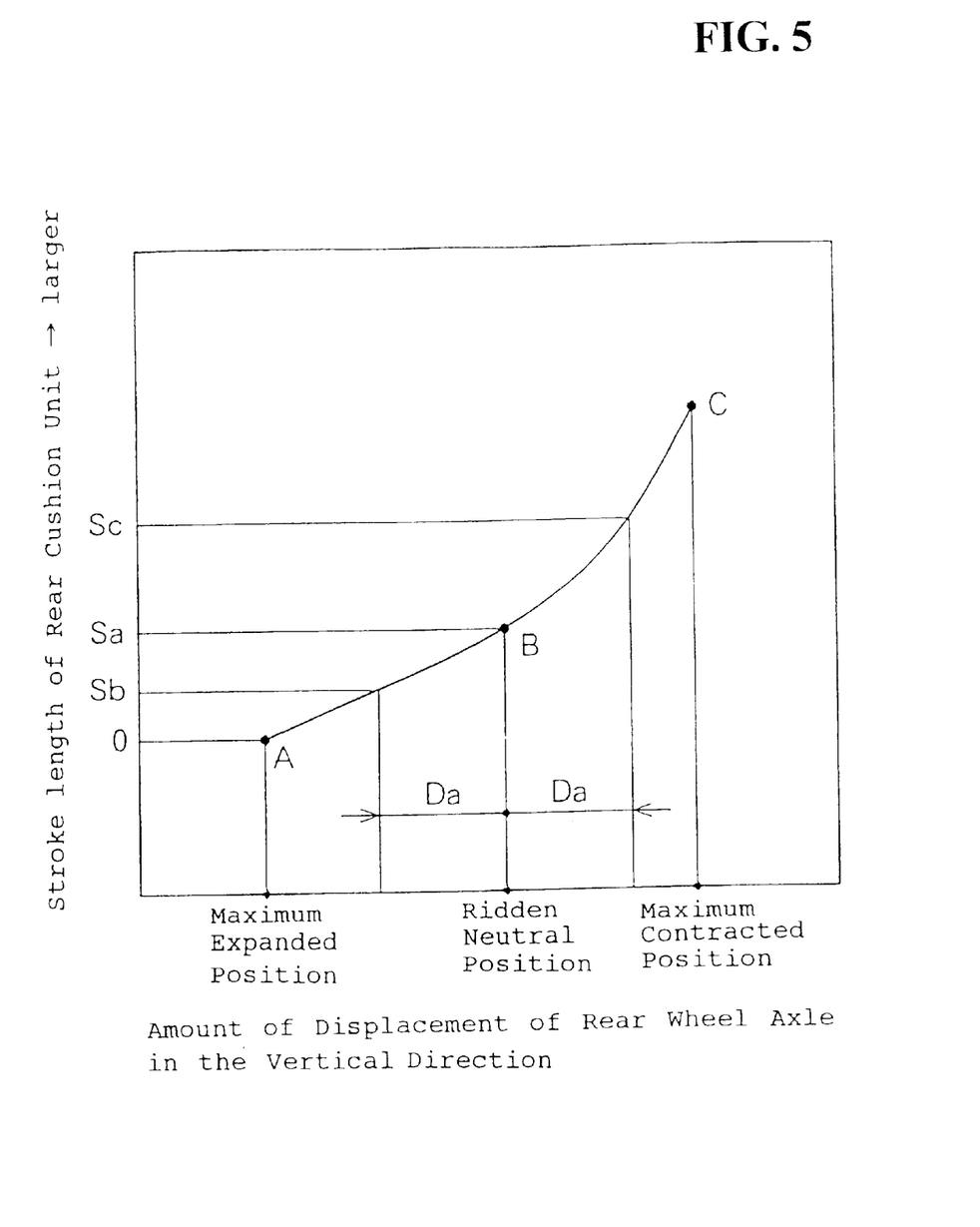
FIG. 5 is a graphical view of the relationship between displacement of the rear wheel axle and the stroke length of the cushion unit in the swing arm type suspension according to the first embodiment of the present invention.
Figure 6:
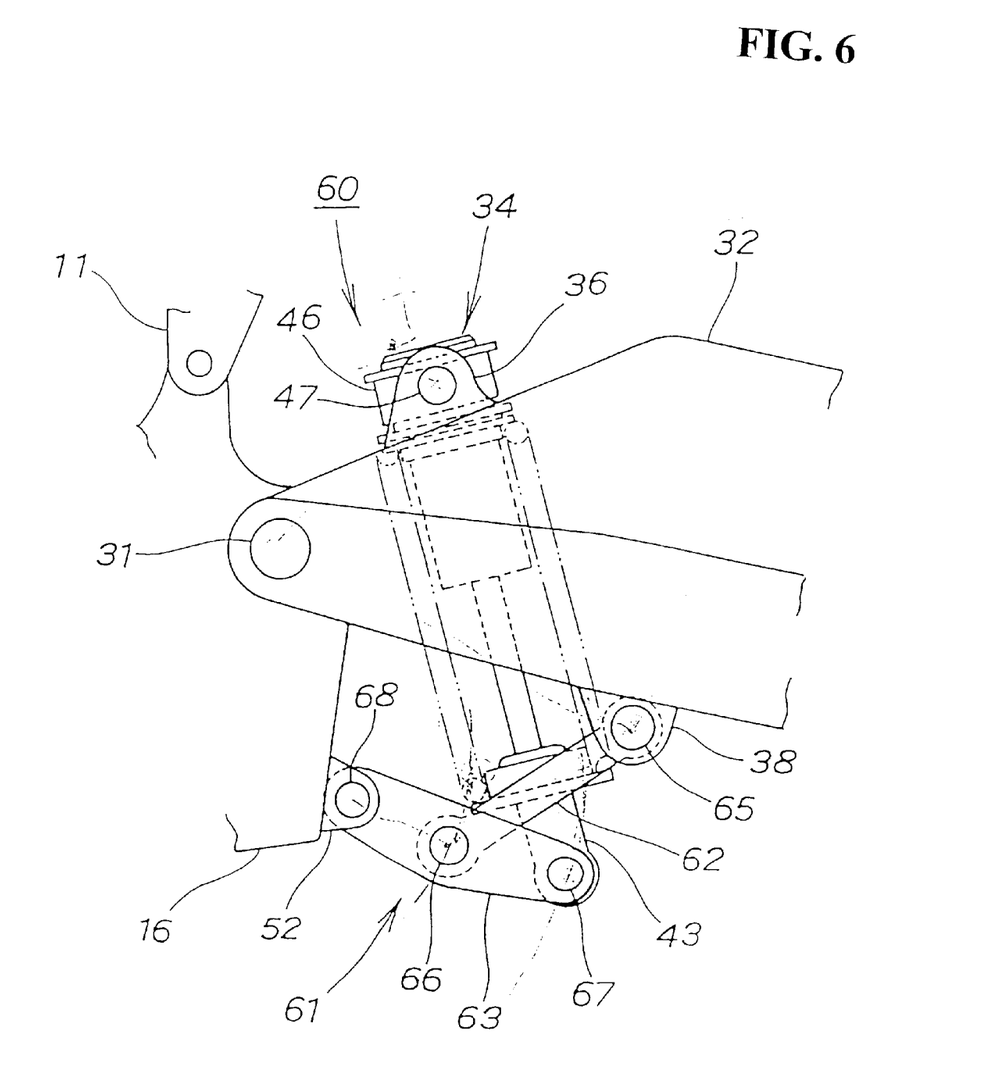
FIG. 6 is a side view of the swing arm type suspension according to a second embodiment of the present invention.
Figure 7:
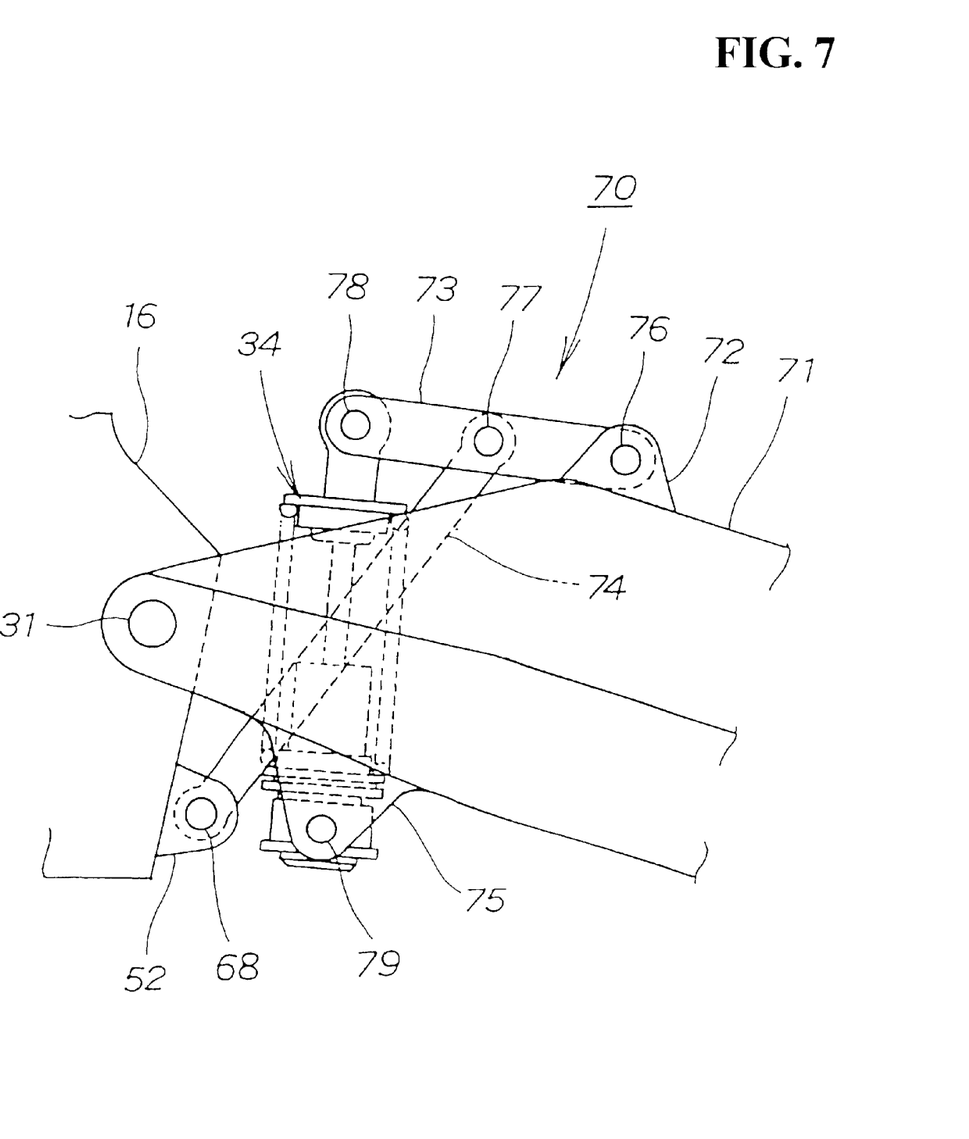
FIG. 7 is a side view of the s wing arm type suspension according to a third embodiment of the present invention.
Figure 8:
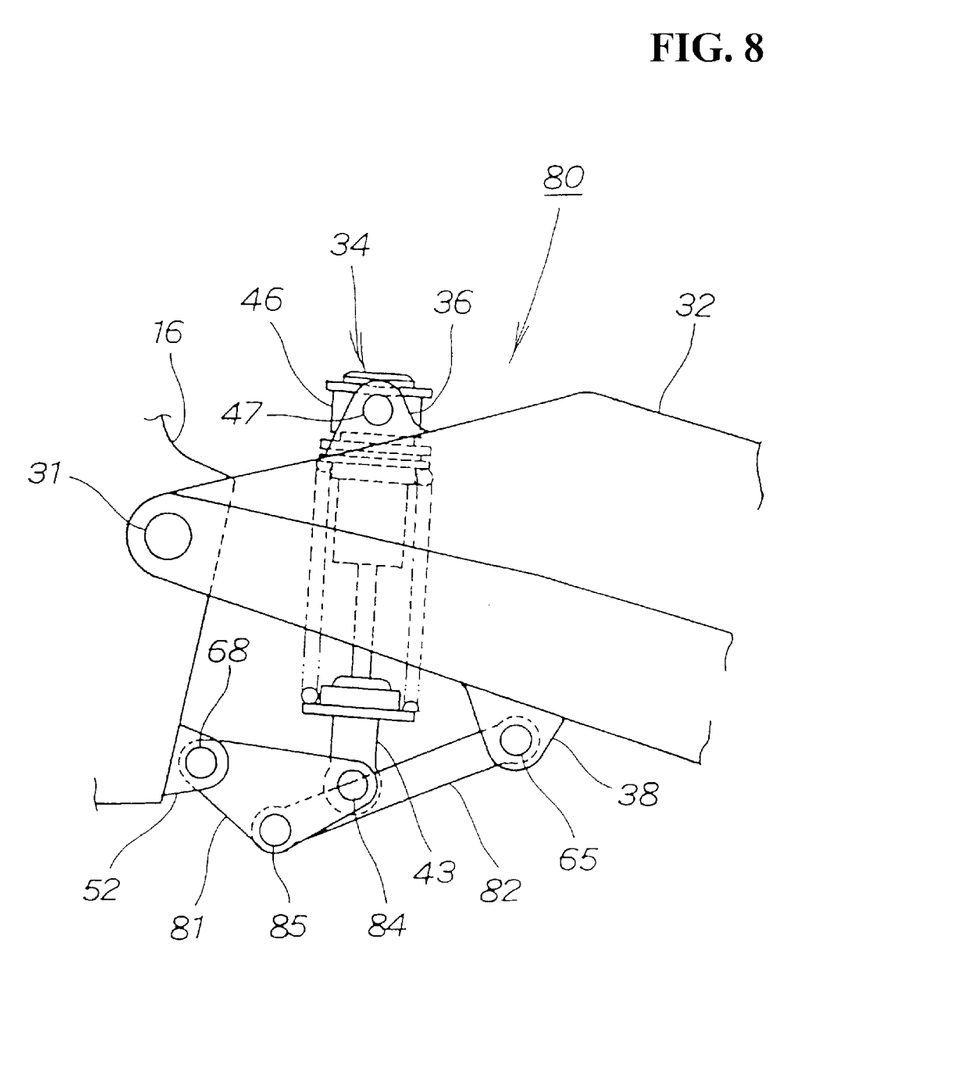
FIG. 8 is a side view of the swing arm type suspension according to a fourth embodiment of the present invention.

The present invention will hereinafter be described with reference to the accompanying drawings. FIG. 1 is a side view of a vehicle provided with a swing arm type suspension according to a first embodiment of the present invention. FIG. 2 is a side view of the swing arm type suspension according to the first embodiment of the present invention. FIG. 3 is a side view of an operation of the swing arm type suspension according to the first embodiment of the present invention. FIG. 4 is a side view of an operation of the swing arm type suspension according to the first embodiment of the present invention. FIG. 5 is a graphical view of the relationship between displacement of the rear wheel axle and the stroke length of the cushion unit in the swing arm type suspension according to the first embodiment of the present invention. FIG. 6 is a side view of the swing arm type suspension according to a second embodiment of the present invention. FIG. 7 is a side view of the swing arm type suspension according to a third embodiment of the present invention. FIG. 8 is a side view of the swing arm type suspension according to a fourth embodiment of the present invention.

FIG. 1 is a side view of a vehicle provided with a swing arm type suspension according to a first embodiment of the present invention. A motorbike 10 includes a main frame 11, a front fork 13 and a front wheel 14 mounted on a head pipe 12 fixed to the front end of the main frame 11 so as to be capable of steerage. A handle 15 is mounted on the upper portion of the front fork 13.

A power unit 16 including an engine and a change gear is mounted at a lower portion of the main frame 11 as a part of the vehicle body. A swing arm type suspension 30 according to the present invention is mounted at the rear of the power unit 16. A fuel tank 17 is mounted above the main frame 11, and seats 18, 21 are disposed at the rear of the fuel tank 17. A cowling 22 is also provided covering the vehicle frame 11. A seat frame 23 and a sub frame 24 extend from the rear portion of the main frame 11 diagonally upward toward the rear of the vehicle. A rear wheel axle 25 is provided for supporting a rear wheel 33.

The swing arm type suspension 30 is constructed in such a manner that a pivot shaft 31 is provided at the rear portion of the power unit 16 and a swing arm 32 to the pivot shaft 31 is mounted at the front end thereof so as to be capable of a swinging motion. The rear wheel 33 is mounted at the rear end of the swing arm 32. An upper end of a cushion unit 34 is mounted to the swing arm 32 at a position in the vicinity of the pivot shaft 31 for absorbing shock and preventing shock from being transmitted to the vehicle body via the rear wheel 33 and the swing arm 32. A lower end of the cushion unit 34 is mounted to the lower portion of the power unit 32 via a linking mechanism 37 (described hereinafter).

FIG. 2 is a side view of the swing arm type suspension according to the first embodiment of the present invention. The swing arm 32 is provided with an upper bracket 36 for mounting the cushion unit 34 at the upper portion thereof and with a lower bracket 38 for mounting the linking mechanism 37 at the lower portion thereof.

The cushion unit 34 (or shock absorber) includes a cylinder portion 41, a piston rod 42 mounted on the piston (not shown in the figure) movably stored in the cylinder portion 41, a lower end mounting portion 43 provided at the end of the piston rod 42, and a suspension spring 44 interposed between the cylinder portion 41 and the lower end mounting portion 43. The upper end mounting portion 46 provided at the end of the cylinder portion 41 is mounted to the upper bracket 36 of the swing arm 32 so as to be capable of a swinging motion. The lower end mounting portion 43 is mounted to the linking mechanism 37. The reference numeral 47 designates an upper swing shaft.

The linking mechanism 37 includes a first link 51 having a triangular shape (in side view) mounted on the lower bracket 38 of the swing arm 32 so as to be capable of a swinging motion, and a second link 53 mounted to the first link 51 at one end thereof so as to be capable of a swinging motion. The second link 53 is connected to a link mounting portion 52 provided at the lower portion of the power unit 32 so as to be capable of a swinging motion. The reference numeral 55 designates a power unit swing shaft on the side of the power unit.

The first link 51 is linked to the lower bracket 38 of the swing arm 32 by the first shaft 56, to the second link 52 by the second shaft 57, and to the lower end mounting portion 43 of the cushion unit 34 by the third shaft 58 so as to be capable of supporting a swinging motion. The power unit swing shaft 55 is a shaft located below the pivot shaft 31.

The operation of the swing arm type suspension 30 as described hereinabove will now be described in greater detail. FIG. 3 is a side view of the swing arm type suspension according to the first embodiment of the present invention.

For example, when the motorbike 10 rides over a projection on the road, and the rear wheel 33 moves upward with respect to the vehicle body (the main frame 11 or the power unit 16), the swing arm 32 swings from the position shown by a phantom line (in FIG. 3) to the position shown by a solid line upwardly about the pivot shaft 31 as shown by the arrow (1). Accordingly, the first link 51 swings clockwise about the first shaft 56 as shown by the arrow (2), and the lower end mounting portion 43 mounted on the third shaft 58 moves upwardly as shown by the arrow (3). Therefore, the cushion unit 34 generates a damping force while being compressed to absorb shock from the vehicle 10.

FIG. 4 is a side view of the swing arm type suspension according to the first embodiment of the present invention. FIG. 4 shows an operation of the swing arm type suspension and further explains the relationship between the vertical distance of the movement of the rear wheel axle 25 of the swing arm 32 and the stroke length of the cushion unit 34. In the figure, the large double-circle designates the rear wheel axle 26, and the small double-circles designate the upper swing shaft 47 and the third shaft 58 respectively.

When the rear wheel axle 25 is at the position shown by the double-circle, the motorbike is in the "ridden neutral position." This position is achieved in a state in which the driver is riding on the motorbike 10, and the motorbike 10 is in the halted state (without applying a force generated by acceleration or deceleration to the vehicle body) in the upright position (also called "the position of ridden 1G state"). This position is also the ridden neutral position of the swing arm 32 and the rear wheel 33 (See FIG. 1). The third shaft 58 that is a shaft linking the linking mechanism 37 (See FIG. 2) and the cushion unit 34 (See FIG. 2) comes to the position shown by the double-circle in the ridden neutral position as well.

A length of the cushion unit 34 (the distance between the shaft center 47a of the upper swing shaft 47 and the shaft center 58a of the third shaft 58) during the ridden neutral position is represented by La. The length of the cushion unit 34 when it is extended to the fullest extent is represented by Le. Therefore, the stroke length Sa of the cushion unit 34 at the ridden neutral position will be defined by the following equation:

$$Sa = Le - La.$$

When the swing arm 32 is swung from the ridden neutral position in the direction in which the cushion unit 34 (See FIG. 2) expands, i.e. downward, the swing arm 32, the upper bracket 36 of the swing arm 32, the lower end mounting portion 43 of the cushion unit 34, the third shaft 58, and the rear wheel axle 25 take the positions shown by the solid line. The distance of the movement of the rear wheel axle 25 in the direction in which the cushion unit 34 expands at this time (the distance of the movement of the shaft center 25a of the rear wheel axle 25) is represented by Da. The whole length of the cushion unit 34 at this time is represented by Lb and the stroke length Sb thereof is represented by $Sb = Le - Lb$.

When the swing arm 32 is swung from the ridden neutral position in the direction in which the cushion unit 34 contracts, i.e. swung upward, the swing arm 32, the upper bracket 36 of the swing arm 32, the lower end mounting portion 43 of the cushion unit 34, the third shaft 58, and the rear wheel axle 25 take the positions shown by the dotted-dashed line. The distance of the movement of the rear wheel axle 25 in the direction in which the cushion unit 43 contracts at this time is the same as the distance of the movement described above and is represented by Da. The whole length of the cushion unit 34 at this time is represented by Lc, and the stroke length Sc is represented by $Sc = Le - Lc$.

In the swing arm type suspension 30 (See FIG. 2) of the present invention, by employing the linking mechanism 37 (See FIG. 2), the relationship of $(Sc-Sa) > (Sa-Sb)$ is satisfied. In other words, the stroke length of the cushion unit 34 increases as the rear wheel axle 25 moves in the direction in which the cushion unit 34 contracts, i.e. upward. Accordingly, the speed of the movement of the piston of the cushion unit 34 increases, and thus a damping force generated at the cushion unit 34 increases.

FIG. 5 is a graphical view showing the relationship between displacement of the rear wheel axle and the stroke length of the cushion unit in the swing arm type suspension according to the first embodiment of the present invention. The vertical axis, e.g. ordinate, represents the stroke length of the cushion unit, and the horizontal axis, e.g. abscissa, represents the amount of displacement of the rear wheel axle in the vertical direction.

When the amount of displacement of the rear wheel axle 25 in the vertical direction is in the range between the maximum expanded position A of the cushion unit 34 and the ridden neutral position B, the stroke length of the cushion unit 34 increases almost linearly with respect to an increase in the amount of displacement of the rear wheel axle 25 in the vertical direction.

When the amount of displacement of the rear wheel axle 25 in the vertical direction is in the range between the ridden neutral position B and the maximum contracted position C of the cushion unit 34, the proportion of increase in stroke length of the cushion unit 34 gradually increases with respect to a corresponding increase in the amount of displacement of the rear wheel axle 25 in the vertical direction.

By employing the linking mechanism 37 that gradually increases the stroke length of the cushion unit 34 or increasing the stroke velocity of the cushion unit 34 when the rear wheel axle 25 is displaced from the ridden neutral position in the direction in which the cushion unit 34 contracts, a damping force generated at the cushion unit 34 may be increased to prevent the cushion unit 34 from coming into contact with the ground near the maximum contracted position of the cushion unit 34. Accordingly, a damping force generated at the cushion unit 34 may be reduced to improve the ride quality near the ridden neutral position.

The present invention provides a swing arm type suspension for vehicles in which the fixtures and components are concentrated in a central portion of the vehicle body frame in order to enhance the physical capability of the vehicle, increase assembler productivity, reduce vehicle size, and expand available design configurations of a vehicle body frame.

The present invention also permits subassemblies to be utilized in the production process, in which the subassembly assembled in the production line can easily be transported and the subassembly can easily be mounted to the side of the vehicle body.

As is described in conjunction with FIG. 1 and FIG. 2, an embodiment of the present invention includes one end of the swing arm 32 mounted to the pivot shaft 31 provided on the power unit 16 so as to be capable of a swinging motion, the rear wheel 33 rotatably mounted to the other end of the swing arm 32, the upper end of the cushion unit 34 mounted to the swing arm 32, and the lower end of the cushion unit 34 is connected to the power unit 16 by the power unit swing shaft 55 which is located below the pivot shaft 31 via the linking mechanism 37.

In the background art, the upper end of a cushion unit is mounted to the vehicle body frame such as a seat frame or the like. In contrast, the upper end of the cushion unit is mounted to the swing arm in an embodiment of the present invention. Accordingly, it is not necessary to provide a cross pipe or a mounting member for mounting the upper end of the cushion unit within the vehicle body frame. Therefore, fixtures such as electrical components (battery, control unit, etc.), the tool box or the like can be concentrated in the center of the vehicle body frame, e.g. within the main frame 11, the eat frame 23, and the sub frame 24.

Therefore, the physical capability of the vehicles specifically designed for off-road driving or for racing can be enhanced, and productivity of the vehicle can be increased. In addition, concentration of the fixtures within the vehicle frame 11 can result in a smaller motorbike 10 and will greatly expand the available design configurations for the vehicle body frame, e.g. the main frame 11, seat frame 23, sub frame 24, and so on.

Another embodiment of the present invention includes one end of the swing arm 32 mounted to the pivot shaft 31 provided on the power unit 16 so as to be capable of a swinging motion, the rear wheel 33 rotatably mounted to the other end of the swing arm 32, and one end of the cushion unit 34 mounted to the swing arm 32. The other end of the cushion unit 34 is mounted to the first link 51 provided as a first linking member linked to the swing arm 32, and the first link 51 is mounted to the second link 53 provided as a second linking member linked to the power unit 16.

When assembling a vehicle, i.e. motorbike 10, in the production line, by assembling the cushion unit 34, the first and the second links 51, 53, and the rear wheel 33 to the swing arm 32 as a subassembly in the sub-line, both ends of the cushion unit 34 can be positioned with respect to the swing arm 32. Therefore, only the ends of the swing arm 32 and the second link 53 must be mounted to the vehicle body side or power unit 16 for assembly of the subassembly to the vehicle body side in the main production line. Accordingly, the subassembly can be easily handled during transportation or assembly in contrast with the swing arm type suspension of the background art.

FIG. 6 is a side view of the swing arm type suspension according to a second embodiment of the present invention. The same structure shown in the first embodiment of FIG. 2 is designated by the same reference numerals and symbols, and a detailed description of their relevance is omitted.

In FIG. 6, a swing arm type suspension 60 includes a pivot shaft 31, a swing arm 32, a cushion unit 34, and a linking mechanism 61. The upper end of the cushion unit 34 is mounted to the upper bracket 36 of the swing arm 32 so as to be capable of a swinging motion, and the lower end of the cushion unit 34 is mounted to the linking mechanism 61 so as to be capable of a swinging motion.

The linking mechanism 61 includes a first link 62, one end of which is mounted to the lower bracket 38 of the swing arm 32 so as to be capable of a swinging motion, and a second link 63, one end of which is mounted to the link mounting portion 52 of the power unit 16 so as to be capable of a swinging motion. The other end of the second link 63 is mounted to the lower end mounting portion 43 of the cushion unit 34 so as to be capable of swinging motion. The center portion of the second link 63 is connected to the other end of the first link 62 so as to be capable of a swinging motion. Reference numeral 65 designates a first shaft, reference numeral 66 designates a second shaft, reference numeral 67 designates a third shaft, and reference numeral 68 designates a power unit swing shaft.

FIG. 7 is a side view of the swing arm type suspension according to a third embodiment of the present invention. The same structure shown in the first embodiment and second embodiments is designated by the same reference numerals and symbols, and a detailed description of their relevance is omitted.

In this swing arm type suspension 70, a swing arm 71 is mounted to the power unit 16 so as to be capable of a swinging motion. An upper bracket 72 is mounted to the upper portion of the swing arm 71, a first link 73 is mounted to the bracket 72, one end of the cushion unit 34 is mounted to the end of the first link 73, one end of the second link 74 is mounted to the central portion of the first link 73, the lower end of the cushion unit 34 is mounted to the lower bracket 75 provided at the lower portion of the swing arm 71, and the end of the second link 74 is mounted to the power unit 16, all to be capable of a swinging motion, respectively. Reference numeral 76 designates the first shaft, reference numeral 77 designates the second shaft, reference numeral 78 designates the third shaft, and reference numeral 79 designates the fourth shaft.

FIG. 8 is a side view of the swing arm type suspension according to a fourth embodiment of the present invention. The same structure shown in the previous embodiments is designated by the same reference numerals and symbols, and a detailed description of their relevance is omitted.

In this swing arm type suspension 80, one end of the swing arm 32 is mounted to the pivot shaft 31 provided on the power unit 16 so as to be capable of a swinging motion. A rear wheel 33 is rotatably mounted to the other end of the swing arm 32, one end of the cushion unit 34 is mounted to the swing arm 32 so as to be capable of swinging motion, and the other end of the cushion unit 34 is mounted to the first link 81 linked to the power unit 16 so as to be capable of a swinging motion. A second link 82 is connected to the swing arm 32 so as to be capable of a swinging motion and is mounted to the first link 81. Reference numeral 84 designates the second shaft, and reference numeral 85 designates the third shaft.

The linking mechanism of the present invention, for example the linking mechanism 37 shown in FIG. 2 is constructed of two links 51, 53. However, one of skill in the art will appreciate that it is not limited thereto, but it may be constructed of one or more than two links.

The present invention of the structure described above has advantages as follows. In the background art, the upper end of a cushion unit is mounted to the vehicle body frame such as a seat frame or the like. In contrast, the upper end of the cushion unit is mounted to the swing arm in an embodiment of the present invention. Accordingly, it is not necessary to provide a cross pipe or a mounting member for mounting the upper end of the cushion unit within the vehicle body frame. Therefore, fixtures such as electrical components (battery, control unit, etc.), the tool box or the like can be concentrated in the center of the vehicle body frame, e.g. within the main frame 11, the seat frame 23, and the sub frame 24.

Therefore, the physical capability of the vehicles specifically designed for off-road driving or for racing can be enhanced, and productivity of the vehicle can be increased. In addition, concentration of the fixtures within the vehicle frame 11 can result in a smaller motorbike 10 and will greatly expand the available design configurations for the vehicle body frame, e.g. the main frame 11, seat frame 23, sub frame 24, and so on.

When assembling a vehicle, i.e. motorbike 10, in the production line, by assembling the cushion unit 34, the first and the second links 51, 53, and the rear wheel 33 to the swing arm 32 as a subassembly in the sub-line, both ends of the cushion unit 34 can be positioned with respect to the swing arm 32. Therefore, only the ends of the swing arm 32 and the second link 53 must be mounted to the vehicle body side or power unit 16 for assembly of the subassembly to the vehicle body side in the main production line. Accordingly, the subassembly can be easily handled during transportation or assembly in contrast with the swing arm type suspension of the background art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm suspension for vehicles comprising:
   a swing arm having a first end and a second end, said first end pivotably mounted to a pivot shaft provided on a side of a vehicle body so as to be capable of achieving a swinging motion, and said second end includes a portion for rotatably mounting a wheel thereon; and
   a cushion unit including a suspension spring, an upper end and a lower end, said upper end of the cushion unit being mounted to said swing arm, and the lower end of the cushion unit being connected to the side of the vehicle body at a position below said pivot shaft.

2. The swing arm suspension for vehicles according to claim 1, further comprising a linking mechanism operatively connecting said lower end of the cushion unit to a lower portion of a power unit.

3. The swing arm suspension for vehicles according to claim 2, said cushion unit further comprising:
   a cylinder portion;
   a piston rod mounted on a piston and moveable within said cylinder portion;
   a lower end mounting portion provided at an end of the piston rod; and
   an upper end mounting portion provided at an end of the cylinder portion.

4. The swing arm suspension for vehicles according to claim 3, wherein said upper end mounting portion is mounted to an upper bracket of the swing arm and said lower end mounting portion is mounted to said linking mechanism.

5. The swing arm suspension for vehicles according to claim 4, said linking mechanism further comprising:
   a first link having a triangular shape; and
   a second link mounted to the first link at an end thereof.

6. The swing arm suspension for vehicles according to claim 5, wherein said first link is linked to a lower bracket of the swing arm by a first shaft, to said second link by a second shaft, and to the lower end mounting portion by a third shaft so as to be capable of achieving a swinging motion.

7. The swing arm suspension for vehicles according to claim 2, said linking mechanism further comprising:
   a first link having a triangular shape; and
   a second link mounted to the first link at an end thereof.

8. The swing arm suspension for vehicles according to claim 1, said cushion unit further comprising:
   a cylinder portion;
   a piston rod mounted on a piston and moveable within said cylinder portion;
   a lower end mounting portion provided at an end of the piston rod; and
   an upper end mounting portion provided at an end of the cylinder portion, wherein said upper end mounting portion is provided in a position above said upper end of said suspension spring.

9. The swing arm suspension for vehicles according to claim 1, further comprising a linking mechanism operatively connecting with said lower end of the cushion unit, said cushion unit having a stroke length increasing as the swing arm moves in a direction equal to a direction in which the cushion unit contracts.

10. A swing arm suspension for vehicles comprising:
    a swing arm having first end and a second end, said first end pivotably mounted to a pivot shaft provided on a side of a vehicle body so as to be capable of achieving a swinging motion, and said second end includes a portion for rotatably mounting a wheel thereon; and
    a cushion unit including a first end and a second end, said first end of the cushion unit being mounted to said swing arm, and the second end of the cushion unit being connected to a linking mechanism at a position below said pivot shaft, wherein said second end of the cushion unit is mounted to a first linking member linked to the swing arm or a second linking member linked to the vehicle body.

11. The swing arm suspension for vehicles according to claim 10, further comprising said second linking member operatively connected with said first linking member.

12. The swing arm suspension for vehicles according to claim 11, wherein a first end of said first linking member is mounted to said second linking member linked to said swing arm, and a second end of said first linking member is operatively connected to a side of the vehicle body.

13. The swing arm suspension for vehicles according to claim 12, wherein at least one of said linking members has a triangular shape.

14. The swing arm suspension for vehicles according to claim 11, wherein said second linking member connects with said first linking member at a center portion of said first linking member and said second linking member is connected to a side of the vehicle body.

15. The swing arm suspension for vehicles according to claim 11, wherein said first linking member is operatively connected with said swing arm.

16. The swing arm suspension for vehicles according to claim 10, said cushion unit further comprising:
    a cylinder portion;
    a piston rod mounted on a piston and moveable within said cylinder portion;
    a lower end mounting portion provided at an end of the piston rod; and
    an upper end mounting portion provided at an end of the cylinder portion.

17. The swing arm suspension for vehicles according to claim 16, wherein said upper end mounting portion is mounted to an upper bracket of the swing arm and said lower end mounting portion is mounted to said linking mechanism.

* * * * *